May 2, 1967
R. T. NOVEY
3,316,646
MILLING MACHINE SCALES
Filed May 22, 1964
2 Sheets-Sheet 1
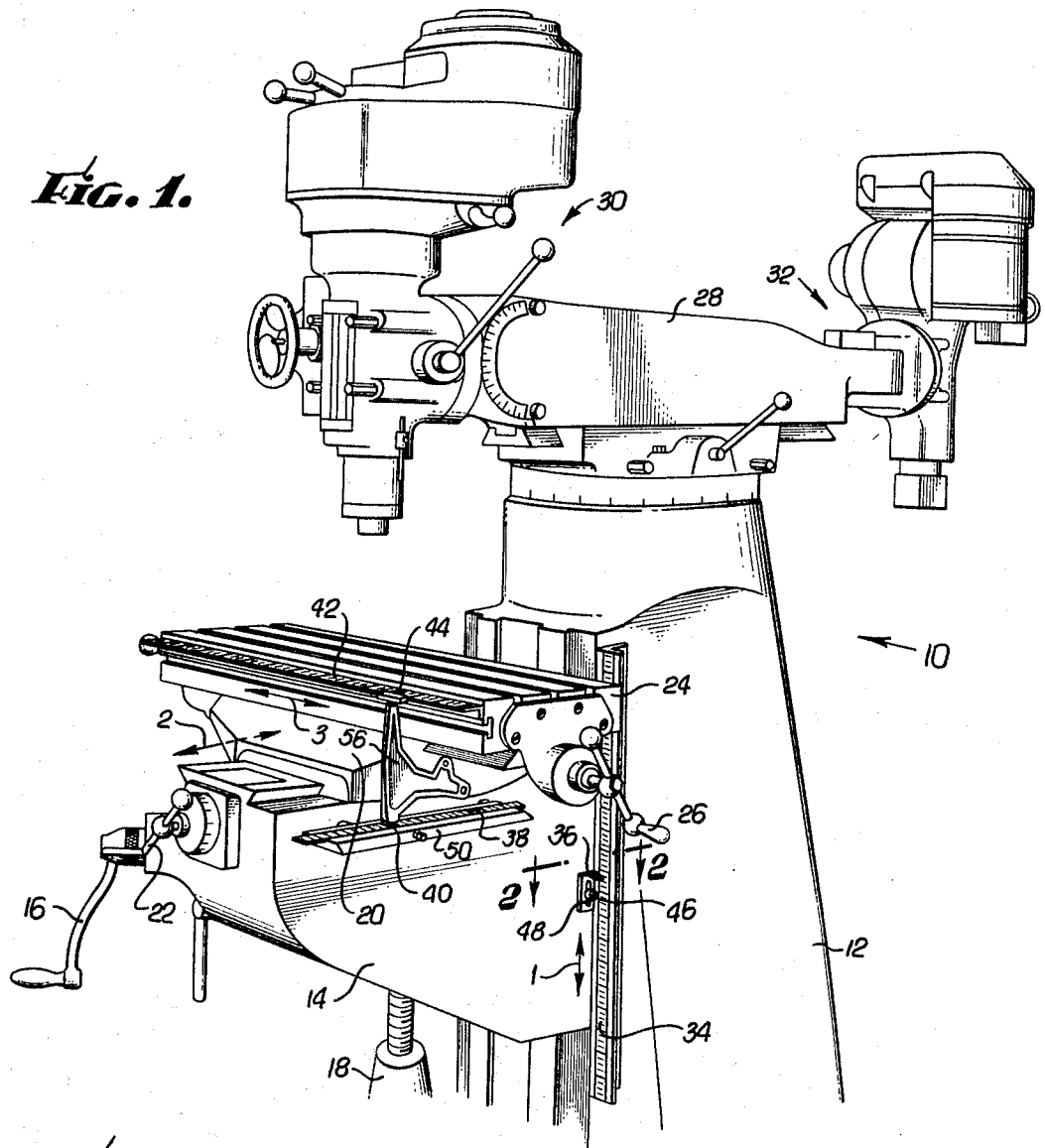
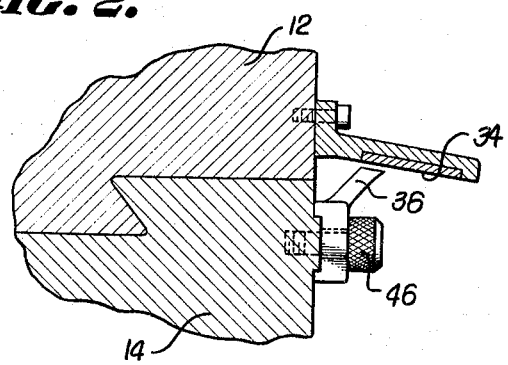
INVENTOR.
RICHARD T. NOVEY
BY Vernon D. Beehler
ATTORNEY.

May 2, 1967

R. T. NOVEY 3,316,646

MILLING MACHINE SCALES

Filed May 22, 1964

INVENTOR.
RICHARD T. NOVEY
BY Vernon D. Beehler
ATTORNEY.

United States Patent Office 3,316,646
Patented May 2, 1967

3,316,646
MILLING MACHINE SCALES
Richard T. Novey, 9216 Vena St.,
Pacoima, Calif. 91331
Filed May 22, 1964, Ser. No. 369,426
2 Claims. (Cl. 33—125)

This invention relates to milling machine gauges and more particularly to milling machine gauges that may be set to an initial reading for the particular work function to be performed to provide easy and convenient measurement.

Heretofore gauges on machines have been placed and set for an initial reference reading for the location of the various machine parts without regard to the initial starting point of the relatively moving parts in commencing a particular job function. For example, a movable carriage carrying a work part and adapted to move from right to left under a cutter may have an initial zero reading in its extreme right position. The carriage may have to move to its 6″ reading before cutter contact is made with the part. A 2″ cut would then terminate with an 8″ reading.

While this example is of a very simple case, the more accurate and complicated measurements require time consuming mental effort, with or without the need for computing or calculating aids. Additional time must be spent in rechecking both before and after the work has been done.

The foregoing disadvantage of these gauges is overcome in accordance with the present invention with the provision of gauges having scales that may be set for an initial reading when the machine has been set for operation on a selected job function. In this manner for every job function the gauge initially has a zero or other easy reference reading.

It is therefore an object of the present invention to provide for an easy and efficient way of obtaining gauge readings on machines.

Another object is to provide for a gauge that has its zero reading corresponding with the initial setting of a machine for a selected job function.

Another object is the provision of a gauge that can be readily set to a zero reading for each of several job functions.

Still another object is the provision of a gauge for a machine having a plurality of relatively moving parts and wherein zero readings may be set for each of the parts in their initial setting for a selected job function.

In order to render the inventive concepts more clear, an embodiment of the invention is illustrated, by way of example only in the accompanying drawings and will be described hereinafter in conjunction with these drawings.

In these drawings:

FIGURE 1 is a perspective view of one type of machine using two forms of gauge in accordance with the present invention.

FIGURE 2 is a fragmentary sectional view taken along the line 2—2 of FIGURE 1.

Figure 3:
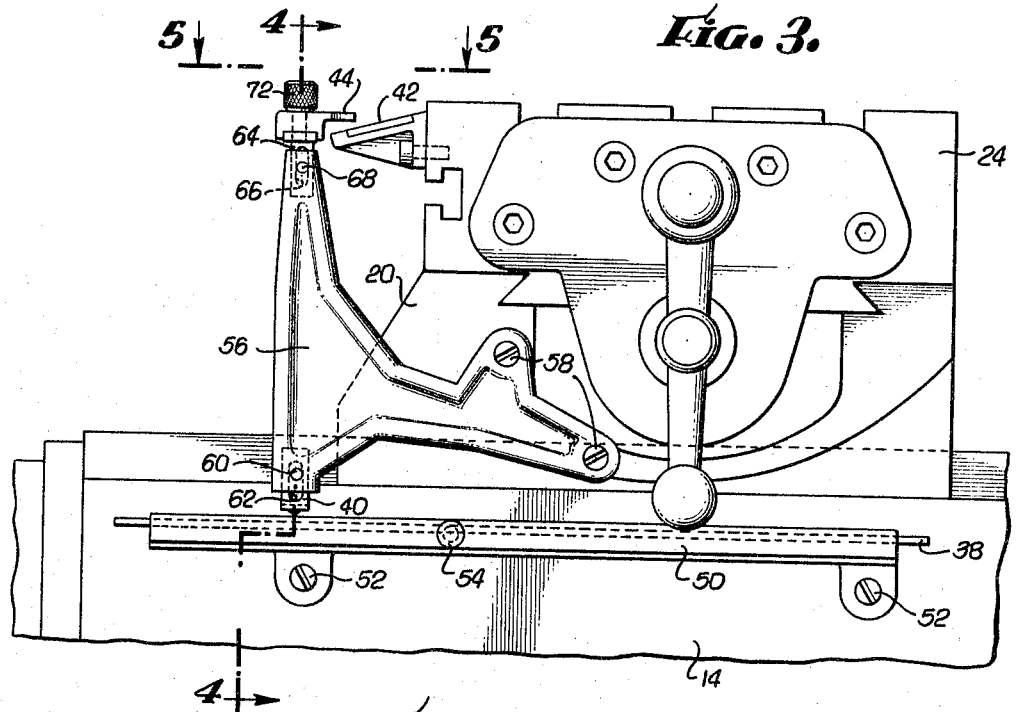
FIGURE 3 is an end view showing attachment of the gauge arm and scales to base, carriage and work table.

Reference is now made to FIGURE 1 wherein is shown a typical machine 10, such as a milling machine for example, having a stand 12 upon which base 14 is mounted for vertical movement as shown by the double pointed arrow 1. Crank 16 is used to manually move the base 14 up and down as desired. Support 18 holds base 14 in the selected position to relieve the weight and pressure on the adjusting threads during the milling operation. Carriage 20 is adapted to move in and out on base 14 as shown by the double pointed arrow 2. Crank 22 is used for this purpose. Work table 24 is adapted to move laterally on carriage 20 as determined by operation of crank 26. Turret 28 has working tools 30, 32 with which work is performed on material not shown, positioned on work table 24. To understand the operation of this basic machine with which the gauge of the present invention may be used, consider the work function of drilling a series of holes a given distance apart in a workpiece. To do this the workpiece is mounted on the work table 24 in a conventional manner and the appropriate drill is positioned in work tool 30. The base 14 is then moved vertically. Carriage 20 is moved in or out, and work table 24 is moved laterally until the workpiece is positioned directly under the drill. After the first drilling operation the work table 24 and carriage 20 are moved to place the next selected position of the workpiece under the drill.

As can be seen, suitable scales and pointers show the relative position of the workpiece in the direction of the double pointed arrows. Scale 34 on stand 12 and pointer 36 on base 14 indicate vertical movement or position, scale 38 and pointer 40 indicate the in and out movement or position of carriage 20, and scale 42 and pointer 44 indicate lateral movement of work table 24.

It can be appreciated by the operator that for a series of job functions the base 14 usually is not moved after the first adjustment. For this reason, pointer 36 is adapted for small movement on base 14 to obtain an easy-to-read initial reading. In this form scale 34 remains stationary, and pointer 36 is moved. Knurled screw 46 through slot 48 on pointer 36 permits this adjustment. FIGURE 2 shows this feature in greater detail. If desired, scale 34 may also be made adjustable relative to its mounting stand 12.

Figure 4:
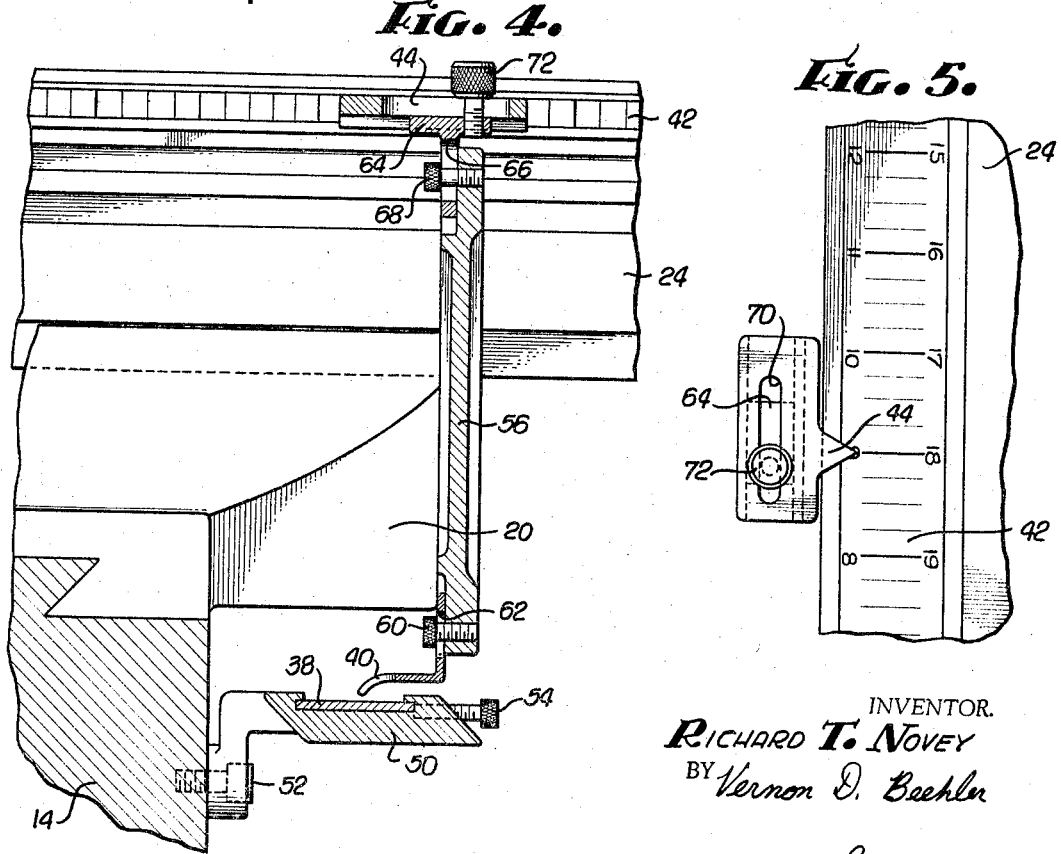
FIGURE 4 is a vertical sectional view taken along the line 4—4 of FIGURE 3.

Referring now to FIGURES 3 and 4, scale 38 is adjustably mounted on base 14 by means of bracket 50. This bracket is horizontally positioned and fastened to base 14 by screws 52. The top surface of bracket 50 is undercut to receive scale 38 which is slidably mounted thereon. Stop nut 54 is used to lock the scale in selected position.

Figure 5:
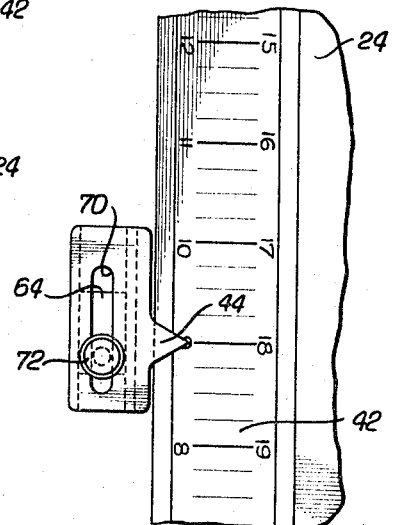
FIGURE 5 is a fragmentary plan view taken along the line 5—5 of FIGURE 3.

Gauge pointer arm 56 is mounted on carriage 20 by means of screws 58. This pointer arm extends downwardly to position pointer 40 adjacent scale 38. Pointer 40 is capable of slight vertical adjustment through its screw 60 and slot 62 connection. Pointer arm 56 also extends upwardly to position pointer 44 adjacent scale 42. Pointer 44 is vertically adjustable relative to bracket 56 through its mounting on bracket 64 with its slot 66 and adjusting screw 68. Pointer 44 is also laterally positionable, as shown in FIGURE 5, through its slot 70 and knurled screw 72.

From the foregoing description of one preferred embodiment it is obvious that after the machine and workpiece has been positioned for a given job function, the scales may all be adjusted for initial easy-to-read readings and will serve as a convenient reference point for subsequent operations. These settings may be quickly altered, as desired, for other settings.

Having thus described an embodiment of the present invention, it is to be understood that this invention is not limited thereto and that its scope may be defined by a broad interpretation of the following claims in view of known earlier existing devices.

What I claim is:
1. A machine comprising:
a base;

a carriage adjustably mounted for transverse movement on said base;

a work table adjustably mounted for lateral movement on said carriage;

a tool in operative association with said table and adapted to perform work on material supported on said table;

a first scale adjustably mounted for transverse movement on said base, said scale extending parallel to the direction of movement of said carriage on said base;

a second scale mounted on said work table, said scale extending parallel to the direction of movement of said work table on said carriage;

a pointer arm attached to and movable with said carriage;

a first pointer adjustably mounted for vertical movement on said arm, said first pointer registering with said first scale to indicate relative movement between said carriage and said base;

a bracket adjustably mounted for vertical movement on said arm; and a second pointer adjustably mounted for lateral movement on said bracket, said second pointer registering with said second scale to indicate relative movement between said work table and said carriage.

2. The machine of claim 1 including:

a stand, said base being adjustably mounted for vertical movement on said stand;

a third scale vertically mounted on said stand;

a third pointer adjustably mounted for vertical movement on said base, said third pointer registering with said third scale to indicate relative movement between said base and said stand.

References Cited by the Examiner

UNITED STATES PATENTS

| | | | |
|---|---|---|---|
| 2,018,363 | 10/1935 | Hoelscher et al. | 33—125 |
| 2,311,142 | 2/1943 | Turrettini. | |
| 2,551,181 | 5/1951 | Sussin. | |
| 2,959,087 | 11/1960 | Strickland | 33—125 X |
| 2,963,791 | 12/1960 | Wolfle | 33—125 |
| 3,106,127 | 10/1963 | Koller | 88—1 X |

FOREIGN PATENTS 886,965   7/1943   France.

ROBERT B. HULL, *Primary Examiner.*